(12) United States Patent
Picqué et al.

(10) Patent No.: US 8,917,396 B2
(45) Date of Patent: Dec. 23, 2014

(54) FOURIER TRANSFORM SPECTROMETER WITH A FREQUENCY COMB LIGHT SOURCE

(75) Inventors: Nathalie Picqué, Gif-sur-Yvette (FR); Guy Guelachvili, Etampes (FR); Julien Mandon, Antony (FR)

(73) Assignees: Centre National de la Recherche Scientifique—CNRS, Paris (FR); Universite Paris-Sud 11, Orsay (FR)

(*) Notice: Subject to any disclaimer, the term of this patent is extended or adjusted under 35 U.S.C. 154(b) by 523 days.

(21) Appl. No.: 13/055,898

(22) PCT Filed: Jul. 20, 2009

(86) PCT No.: PCT/IB2009/006282
§ 371 (c)(1),
(2), (4) Date: Jul. 18, 2011

(87) PCT Pub. No.: WO2010/010437
PCT Pub. Date: Jan. 28, 2010

(65) Prior Publication Data
US 2011/0261363 A1    Oct. 27, 2011

Related U.S. Application Data

(60) Provisional application No. 61/083,620, filed on Jul. 25, 2008.

(51) Int. Cl.
G01B 9/02    (2006.01)
G01J 3/453    (2006.01)

(52) U.S. Cl.
CPC ............................... G01J 3/453 (2013.01)
USPC ........................................... 356/483

(58) Field of Classification Search
CPC ................... G01B 9/02008; G01D 5/35322
USPC .................................. 356/451, 483
See application file for complete search history.

(56) References Cited

U.S. PATENT DOCUMENTS 4,798,467 A    1/1989    Wyeth et al.
5,636,021 A *  6/1997    Udd ........................... 356/483
(Continued)

FOREIGN PATENT DOCUMENTS

DE    102005050151    11/2006
WO    2009000079     12/2008

OTHER PUBLICATIONS

International Search Report for International Application No. PCT/IB2009/006282, European Patent Office, Oct. 29, 2009, pp. 2.

(Continued)

*Primary Examiner* — Jonathan Hansen
(74) *Attorney, Agent, or Firm* — Brinks Gilson & Lione; G. Peter Nichols

(57) ABSTRACT

An embodiment relates to a Fourier transform spectrometer comprising: a coherent light source; an interferometer adapted to separate the coherent light source into two or more parts in order to generate through frequency or phase-induced effects, interferences between the two or more parts; detection means adapted to detect the interferences, wherein the coherent light source comprises a frequency comb generator having a frequency repetition rate, and the detection means are adapted to detect the beating of pairs of frequencies of the frequency comb separated by the frequency repetition rate or a multiple of the frequency repetition rate.

5 Claims, 13 Drawing Sheets

(56) References Cited

U.S. PATENT DOCUMENTS

| | | | |
|---|---|---|---|
| 6,785,303 | B1 | 8/2004 | Holzwarth et al. |
| 7,026,594 | B2 | 4/2006 | Holzwarth et al. |
| 7,259,860 | B2 | 8/2007 | Marron et al. |
| 7,733,492 | B1 * | 6/2010 | Szarmes et al. ............... 356/451 |
| 8,026,513 | B2 | 9/2011 | Furukawa et al. |
| 8,058,093 | B2 | 11/2011 | Wadell et al. |
| 2004/0114148 | A1 * | 6/2004 | Agladze et al. ............... 356/456 |
| 2006/0232781 | A1 * | 10/2006 | Kranz et al. ................... 356/451 |
| 2007/0242275 | A1 * | 10/2007 | Spartz et al. .................. 356/451 |

OTHER PUBLICATIONS

International Search Report for International Application No. PCT/IB2009/006288, European Patent Office, Mar. 22, 2010, pp. 3.

J. Zhang, Z. H. Lu, and L. J. Wang, "Precision measurement of the refractive index of air with frequency combs", Optics Letters, vol. 30, No. 24, Dec. 15, 2005, pp. 3314-3316, XP-002549472.

Christoph Gohle, Bjorn Stein, Albert Schliesser, Thomas Udem, and Theodor W. Hansch, "Frequency Comb Vernier Spectroscopy for Broadband, High-Resolution, High-Sensitivity Absorption and Dispersion Spectra", Physical Review Letters, PRL 99, 263902 (2007), pp. 263902-1-263902-4, XP-002549473.

Julien Mandon, Guy Guelachvili and Nathalie Picque, "Fourier transform spectroscopy with a laser frequency comb", Nature Photonics, vol. 3, Feb. 2009, pp. 99-102, XP-002549474.

Philippe Giaccari, Jean-Daniel Deschenes, Philippe Saucier, Jerome Genest and Pierre Tremblay, "Active Fourier-transform spectroscopy combining the direct RF beating of two fiber-based mode-locked lasers with a novel referencing method", Optics Express, vol. 16, No. 6, Mar. 17, 2008, pp. 4347-4365.

Julien Mandon, Guy Guelachvili, Nathalie Picqué, Frédéric Druon, and Patrick Georges, "Femtosecond laser Fourier transform absorption spectroscopy", Optics Letters, vol. 32, No. 12, Jun. 15, 2007, pp. 1677-1679.

Th. Udem, R. Holzwarth & T. W. Hänsch, "Optical frequency metrology", 2002 Macmillan Magazines Ltd, Nature, vol. 416, Mar. 14, 2002, pp. 233-237.

Steven T. Cundiff, and Jun Ye, "Colloquium: Femtosecond optical frequency combs", 2003 The American Physical Society, Reviews of Modern Physics, vol. 75, Jan. 2003, pp. 325-342.

Peter R. Griffiths, Blayne L. Hirsche, Christopher J. Manning, "Ultra-rapid-scanning Fourier transform infrared spectrometry", Elsevier, Vibrational Spectroscopy 19(1999), pp. 165-176.

Christoph Gohle, Bjorn Stein, Albert Schliesser, Thomas Udem, and Theodor W. Hansch, "Frequency Comb Vernier Spectroscopy for Broadband, High-Resolution, High-Sensitivity Absorption and Dispersion Spectra", 2007 The American Physical Society, PRL 99, Dec. 31, 2007, pp. 263902-1-263902-4.

Gary C. Bjorklund, "Frequency-modulation spectroscopy: a new method for measuring weak absorptions and dispersions", Optics Letters, vol. 5, No. 1, Jan. 1980, pp. 15-17.

Julien Mandon, Guy Guelachvili, and Nathalie Picqué, "Frequency-modulation Fourier transform spectroscopy: a broadband method for measuring weak absorptions and dispersions", Optics Letters, vol. 32, No. 15, Aug. 1, 2007, pp. 2206-2208.

Fritz Keilmann, "Time-domain mid-infrared frequency-comb spectrometer", 2004 Optical Society of America, Optics Letters, vol. 29, No. 13, Jul. 1, 2004, pp. 1542-1544.

S. Schiller, "Spectrometry with frequency combs", 2002 Optical Society of America, Optics Letters, vol. 27, No. 9, May 1, 2002, pp. 766-768.

Ian Coddington, William C. Swann, and Nathan R. Newbury, "Coherent Multiheterodyne Spectroscopy Using Stabilized Optical Frequency Combs", Physical Review Letters, PRL 100, Jan. 11, 2008, pp. 013902-1-013902-4.

* cited by examiner

FOURIER TRANSFORM SPECTROMETER WITH A FREQUENCY COMB LIGHT SOURCE

PRIORITY CLAIM

The present application is a national phase application filed pursuant to 35 USC §371 of International Patent Application Serial No. PCT/IB2009/006282, filed Jul. 20, 2009; which further claims the benefit of U.S. Provisional Patent Application Ser. No. 61/083,620 filed Jul. 25, 2008; all of the foregoing applications are incorporated herein by reference in their entireties

RELATED APPLICATION DATA

This application is related to U.S. patent application Ser. No. 13/055,909, entitled INTERFEROMETER WITH FREQUENCY COMBS AND SYNCHRONISATION SCHEME filed Jul. 18, 2011, and which is incorporated herein by reference in its entirety.

TECHNICAL FIELD

An embodiment relates to the field of optical spectrometry. It is directed to a Fourier spectrometer and to a method for measuring a spectrum of a sample using such Fourier spectrometer.

BACKGROUND

An embodiment is more particularly directed to a Fourier spectrometer comprising:
a coherent light source;
an interferometer adapted to separate, by amplitude or wavefront separation, the coherent light source into two parts in order to generate interferences between the two parts;
detection means adapted to detect the interferences.

Such Fourier spectrometer is described e.g. in "Femtosecond laser Fourier Transform absorption spectroscopy", Mandon et al. OPTICS LETTERS, Jun. 15, 2007 Vol. 32, No. 12 p. 1677-1679, which is incorporated by reference. In this document the coherent light source is a $Cr^{4+}$:YAG femtosecond mode-locked laser.

However, the use of the $Cr^{4+}$:YAG femtosecond mode-locked laser as light source in the aforementioned document has several drawbacks. The repetition rate of the mode-locked laser is not constant and the phase shift between the pulses of the mode-locked laser is not stabilized. As a consequence, the spectrum of the mode-locked does not exhibit a comb-like structure made of sharp and equidistant frequency markers. Because this comb structure is missing, it is necessary to know the spectrum of some reference species of the sample in order to calibrate the spectrometer. Furthermore, interferences can only be measured between a frequency of the mode-locked laser and the same frequency shifted by Doppler effect. Therefore, the noise level of the spectrometer is limited by the fringe scanning rate, typically in the audio domain, produced by the interferometer and by the amplitude noise of the mode-locked laser. In addition, such spectrometer can not provide simultaneous access to the absorption and dispersion experienced by the sample.

An embodiment provides an improved Fourier spectrometer which is capable of overcoming the aforementioned limitations of the known art.

An embodiment is based on the idea that frequency comb generators, which are mainly used in the context of metrology, can provide satisfactory stabilized pulses, overcoming the above cited drawbacks.

Accordingly a first embodiment relates to a Fourier transform spectrometer comprising:
a coherent light source;
an interferometer adapted to separate the coherent light source into two or more parts in order to generate through frequency- or phase-induced effects, interferences between the two or more parts;
detection means adapted to detect the interferences,
wherein the coherent light source comprises a frequency comb generator having a frequency repetition rate, and in a particular embodiment, the detection means may be adapted to detect the beating of pairs of frequencies of the frequency comb separated by the frequency repetition rate or a multiple of the frequency repetition rate.

In the prior art, the detection was made from the beating of a certain frequency with the replica of this frequency, which is frequency-shifted by Doppler-effect or phase-shifted effect produced by the moving arm of the interferometer. With an embodiment, the stability of repetition rate of the frequency comb is advantageously used to make the detection from pairs of frequencies separated by the frequency repetition rate or a multiple of the frequency repetition rate, i.e. N times the frequency repetition rate with $N \geq 1$.

With this new type of detection, the noise level of the interferogram is decreased by at least 1000.

The interferometer may be an interferometer based on amplitude or wavefront separation of the incoming source into two beams. For instance, it may be a Michelson interferometer, which comprises in its simplest optical configuration a fixed mirror, a moving mirror and separating means adapted to separate the coherent light source into two parts, the first part being adapted to reflect on the fixed mirror, and the second part being adapted to reflect on the moving mirror. All traditional interferogram recording procedures (one or more or no moving mirror, one or more or no fixed mirror, linear or not variations of the path difference producing the interferogram) are usable.

BRIEF DESCRIPTION OF THE DRAWINGS

One or more embodiments will be set forth in detail with reference to the drawings in which.

DETAILED DESCRIPTION

Figure 1:
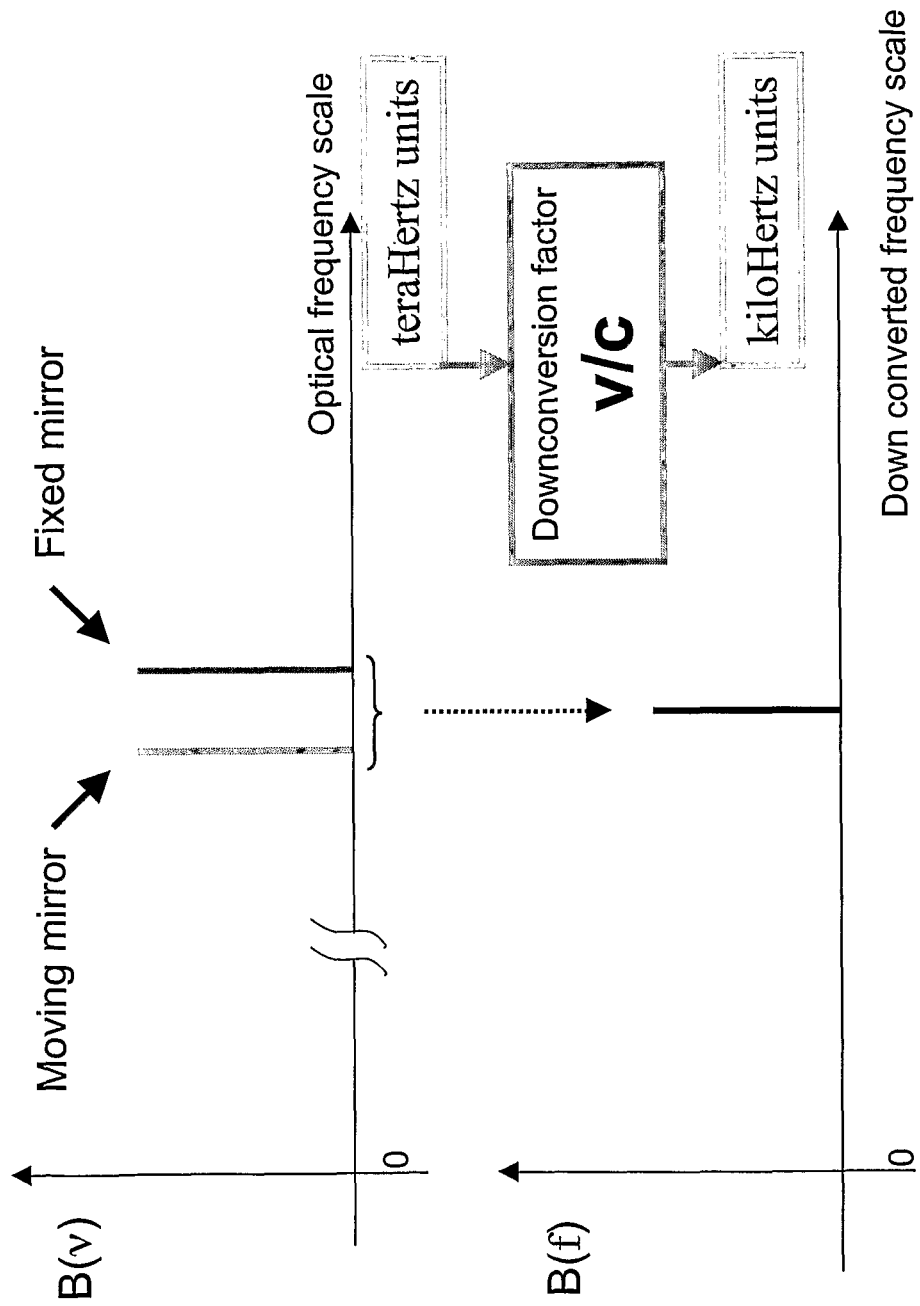
FIG. 1 illustrates the down-conversion in a Fourier Transform spectrometer with monochromatic source and a Michelson interferometer

One or more embodiments will be set forth in detail with reference to the drawings, in which like reference numerals refer to like elements throughout. The herein presented spectrometer, called Fourier Transform Spectrometer with a frequency comb light source or 1C-FTS hereafter, is primarily aimed at Fourier Transform Spectroscopy and all related instrumental methodologies (hyperspectral imaging, microscopy, vibrational circular dichroism, attenuated total reflection, Zeeman modulation, velocity modulation, selective detection techniques, time-resolved spectroscopy . . . ), but it is noted that the two-beam interferometer with a frequency comb light source may also be used beyond the herein described applications. For example, the herein described two-beam interferometer with a frequency comb light source may be adapted to be used in Optical Coherence Tomography (OCT), interferometric length measurements, Light Detection And Ranging (LIDAR), reflectometry. Other interferometric applications, based on wavefront or amplitude recombination, not specifically described herein may also benefit from a two-beam or multiple-beam interferometer producing frequency- or phase-induced effects, with a frequency comb light source and the synchronous detection technique described hereafter.

As illustrated in FIG. 1 and known per se, Fourier Transform spectroscopy with monochromatic source and a Michelson interferometer provides a down-conversion of the optical frequencies to the audio range, with a down-conversion factor equal to 2 v/c where v is the interferometer moving mirror velocity and c is the speed of the light.

The frequency comb generator according to an embodiment is discussed. An optical Frequency Comb (FC) is an optical spectrum, which consists of phase-coherent equidistant laser lines. Frequency combs are well known in the art, for example from the patents "Generation of stabilized, ultrashort light pulses and the use thereof for synthesizing optical frequencies" R. Holzwarth, J. Reichert, T. Udem, T. W. Hänsch, U.S. Pat. No. 6,785,303, 2004 or "Method and device for producing radio frequency waves", R. Holzwarth, T. Udem, T. W. Hansch, U.S. Pat. No. 7,026,594, 2006 or the publication "Optical frequency metrology" T. Udem, R. Holzwarth, T. W. Hansch *Nature* 416, 233 (2002), which are incorporated by reference and which are most often used in frequency metrology.

Most often, femtosecond lasers are used, leading to a femtosecond frequency comb (FFC). In such case, the distance $f_{rep}$ between two consecutive lines depends on the mode locked laser cavity length. With femtosecond lasers, the spectral coverage is of the order of several hundreds of nm. Techniques of generation of a super continuum are available to increase this coverage. The number of the lines constituting a frequency comb may be then of the order of $10^6$ or more. The comb lines frequencies may be known with extremely high accuracy. Details on femtosecond laser based optical frequency synthesis may be found in various articles, such as <<Femtosecond optical frequency combs>> Cundiff et al, Review of Modern Physics vol. 75, p. 325-342 (2003) or <<Optical frequency metrology>>, Udem et al, Nature vol 416, p. 233-237 (2002), which are incorporated by reference.

Summarizing, when using a femtosecond frequency comb, ultra short pulses are periodically emitted by a mode-locked laser with a time period $T=l/v_g$ where l is the length of the laser cavity and $v_g$ is the net group velocity. Due to dispersion in the cavity, the group and phase velocities differ, resulting in a phase shift of the carrier with respect to the peak of the envelope of each pulse. In the frequency domain the spectrum, Fourier transform of the train of periodic pulses; is made of a comb of laser modes, which are separated by the pulse repetition frequency $f_{rep}$. The modes frequencies obey the relation: $f_n = n\, f_{rep} + f_0$ with n integer and $f_0$ due to-envelop pulse-to-pulse phase-shift. Presently the output spectrum of the comb can span more than one octave and the best level of stabilization of $f_{rep}$ and $f_0$ is such that there is no deviation from a perfect grid larger than one part in $10^{19}$.

In other words, a frequency comb is an optical spectrum which consists of equidistant lines. The generation of a frequency comb from a mode-locked laser requires that the periodicity applies not only to the pulse envelopes, but to the whole electric field of the pulses, including their optical phase, apart from a constant phase. Coherence between the pulses is required. The frequency comb generator can also be based on femtosecond oscillators broadened by supercontinuum generation in nonlinear fibers.

Frequency combs produced by femtosecond mode-locked lasers allow large spectral coverage thanks to their extremely short pulse duration. This spectral coverage can be further enhanced with spectral broadening based on highly nonlinear optical fibers through super-continuum generation. This spectral broadening is known to preserve the comb structure. The mode-locked laser may be broadened by a non-linear optical fiber and/or it may be coupled to a frequency conversion system such as difference/sum frequency generation, harmonic generation and/or parametric interaction.

Alternatively, four-wave mixing in an appropriate material, including toroidal microresonators or optical fibers, can produce the combs. A phase-modulated electro-optic device may also produce the combs.

Figure 2:
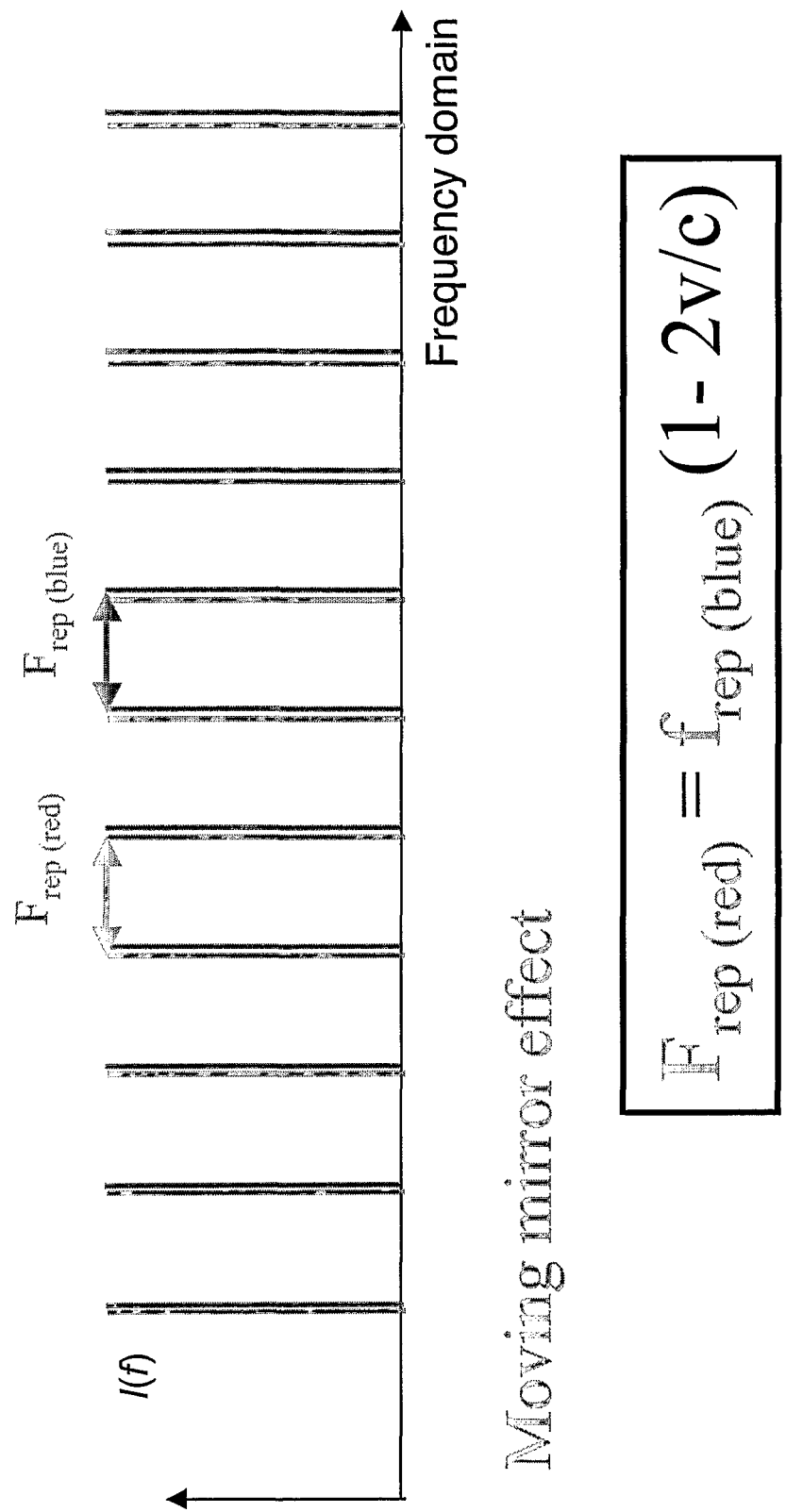
FIG. 2 illustrates the moving mirror effect for a Michelson interferometer with a frequency comb as a source.

According to a first embodiment, with an incoming frequency comb light source, the interferometer delivers, as a function of the path difference Δ, an interference pattern between two different frequency combs (FIG. 2). The first comb reflected by the fixed mirror arm is similar to the initial comb, when the other one in the second arm is Doppler-shifted by the moving mirror. The interferogram recorded on a single detector, results from the optical frequency down-conversion factor equal to 2 v/c, where v is the moving mirror velocity and c the speed of light. In general, the optical frequency down-conversion factor 2 v/c traditionally shifts the infrared signatures to the audio frequency range (~10 kHz). Uppermost down-conversion factors ever reached to our knowledge with a moving mirror interferometer, have shifted the optical signatures down to the 1 MHz range (P. R. Griffiths, B. L. Hirsche, C. J. Manning, Ultra-rapid-scanning Fourier transform infrared spectrometry, *Vib. Spectrosc.* 19, 165 (1999), which is incorporated by reference), but the spectral resolution was then drastically limited (120 GHz). If the comb structure of the light source is resolved by the spectrometer, the resolved comb lines can be used for self-calibration of the wavenumber scale of the spectra. This may be an important advantage because in traditional FTS without a frequency comb light source, the accuracy of the wavenumber scale is mostly limited by the slight misadjustments which always exist between the two different optical paths whereby the monochromatic reference and the analyzed source are recorded. In traditional FTS without a frequency comb light source, when accurate measurements are desired, samples providing internal molecular wavenumber standards often must be placed on the path of the analyzed source and are simultaneously recorded during the experiment. With 1C-FTS, according to an embodiment, the accurate frequency markers provided by the comb source are available, when resolved, across the entire spectrum. This first embodiment is also a very simple fashion to improve signal to noise ratio or recording times in traditional FTS, due to the high brightness of the frequency comb source. A considerable advantage of an embodiment is that, unlike with high finesse cavities injected by frequency combs, no trade-off have to be made between sensitivity and spectral extension.

Figure 3:
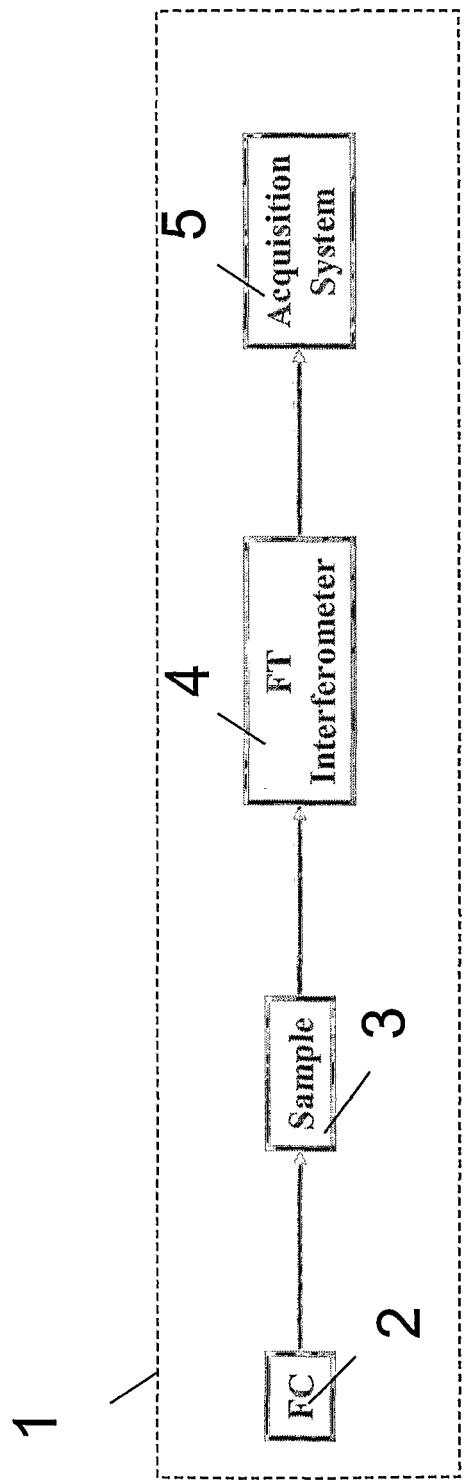
FIG. 3 illustrates a first embodiment of a spectrometer.

A spectrometer 1 according to the first embodiment is now described with reference to FIG. 3. The spectrometer 1 is used for Fourier Transform Spectroscopy with a frequency comb light source (1C-FTS). 1C-FTS consists of using a frequency comb 2, to probe the absorption of a sample of interest 3. The sample may be placed in a multipass cell or in a high finesse cavity. After interaction with the sample, the light is analyzed with a Fourier transform interferometer 4 connected to an acquisition system 5. The resulting interferogram is Fourier-transformed to give the spectrum.

Figure 4:
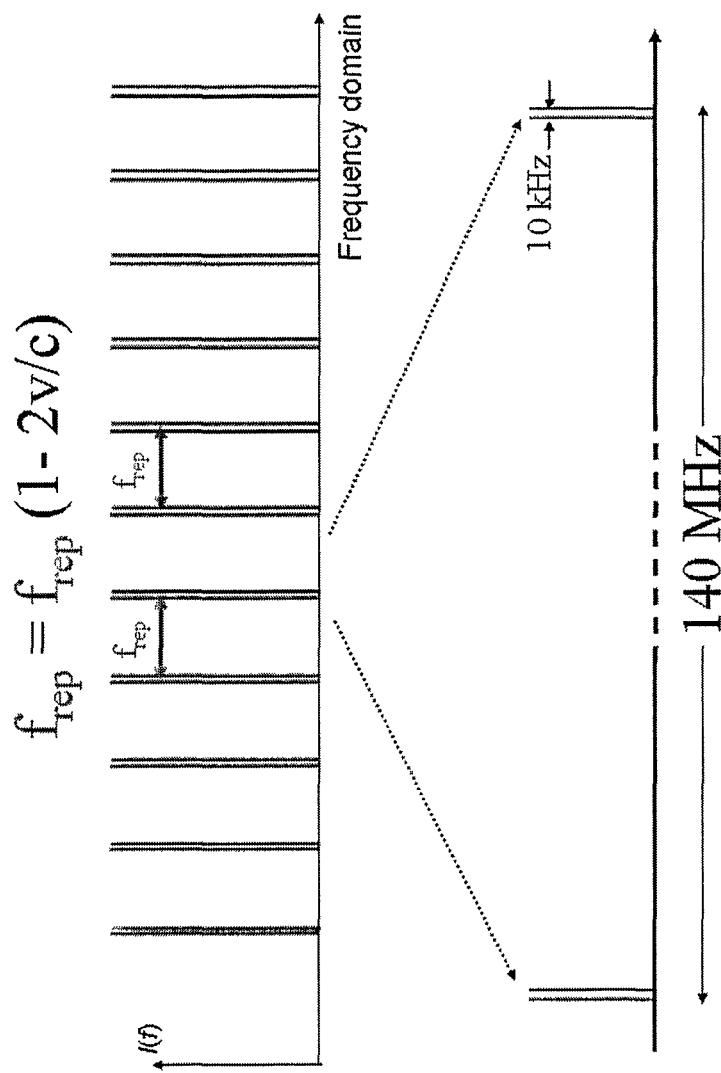
FIG. 4 illustrates the moving mirror effect for a Michelson interferometer with a frequency comb as a source and the possibility of synchronous detection at a rate determined by the comb repetition rate.

According to a second embodiment, thanks to the frequency comb periodic structure, it becomes possible to provide interfering signals at a much higher down-converted frequency, which has its carrier at the frequency comb repetition rate (140 MHz in our example in FIG. 4). Furthermore, this carrier modulation frequency is not related to the speed of the moving mirror. The first row on FIG. 4 represents the two combs interfering on the detector. Only four laser lines are selected on the second row showing two pairs of neighboring lines distant of 140 MHz. The traditional down-converted audio signal (10 kHz in our example in FIG. 4) due to the Doppler-shift produced by the moving mirror is the interfering signature of each pairs of lines. This signal is frequency dependent; in other words, the distance between the lines in each pair varies linearly versus the frequency. On the other hand, the distance between each pair of lines has the same frequency variation, but it is shifted to the constant 140 MHz frequency. A synchronous detection of the beating signature between the four lines of the two pairs at the frequency comb repetition rate is therefore possible. The optical down-conversion factor is shifted in the radio-frequency range, which improves by $10^4$ the frequency of the detection. Besides the potential reduction of the technical noise in the interferogram, the absorption and the dispersion of the spectral features are measured simultaneously within the same high resolution recording sequence. This second embodiment keeps all the other interests described in the first embodiment.

Figure 5:
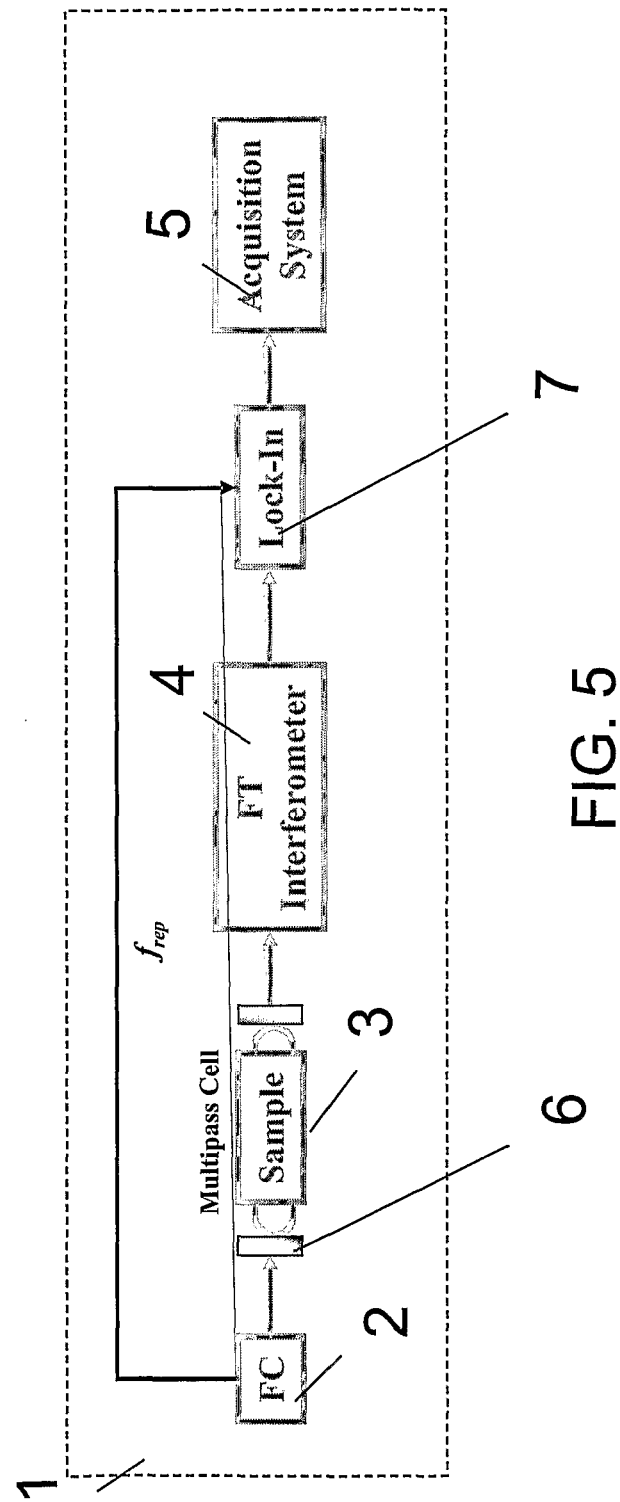
FIG. 5 illustrates a second embodiment of a spectrometer.

As illustrated FIG. 5, to enhance sensitivity, the sample may be placed in a multipass cell or high finesse cavity 6. Additionally, according to the second embodiment, as the light source possesses a comb structure, lock-in detection at the comb frequency rate may be performed with a lock-in device 7. The comb structure may be inherent to the light source or may be created with an external modulator, such as an EOM.

Figure 6:
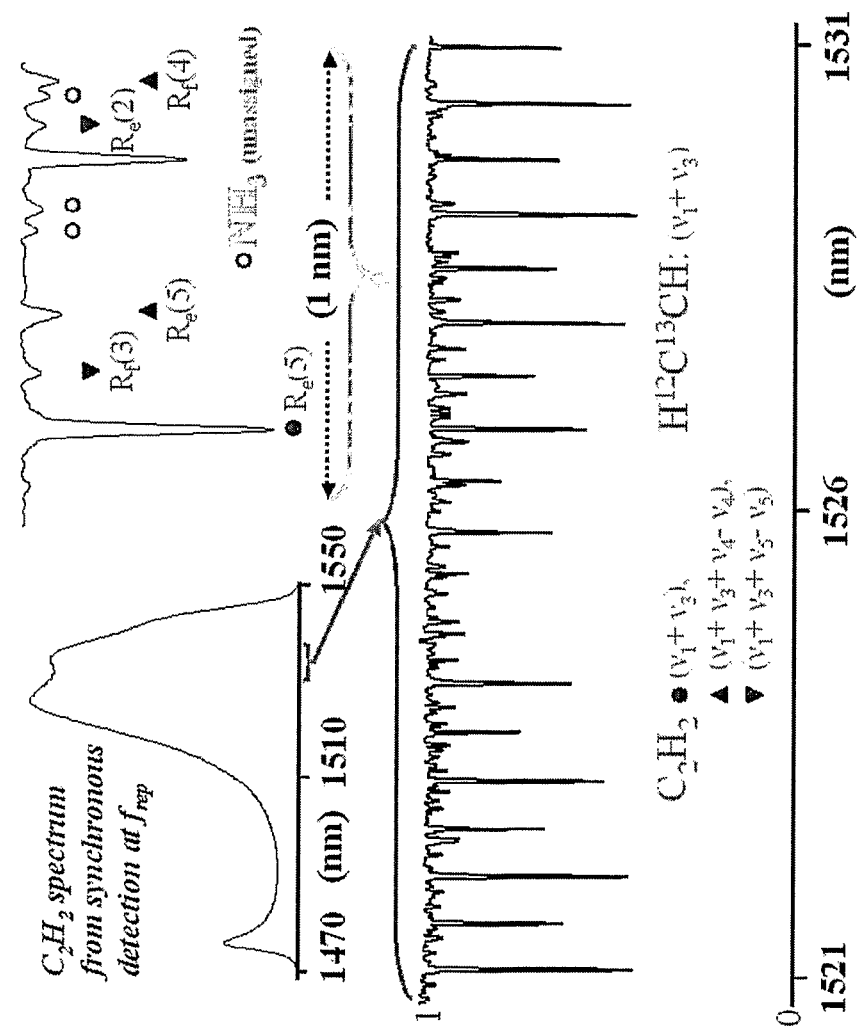
FIG. 6 shows an absorption spectrum obtained with a spectrometer according to an embodiment.
Figure 7:
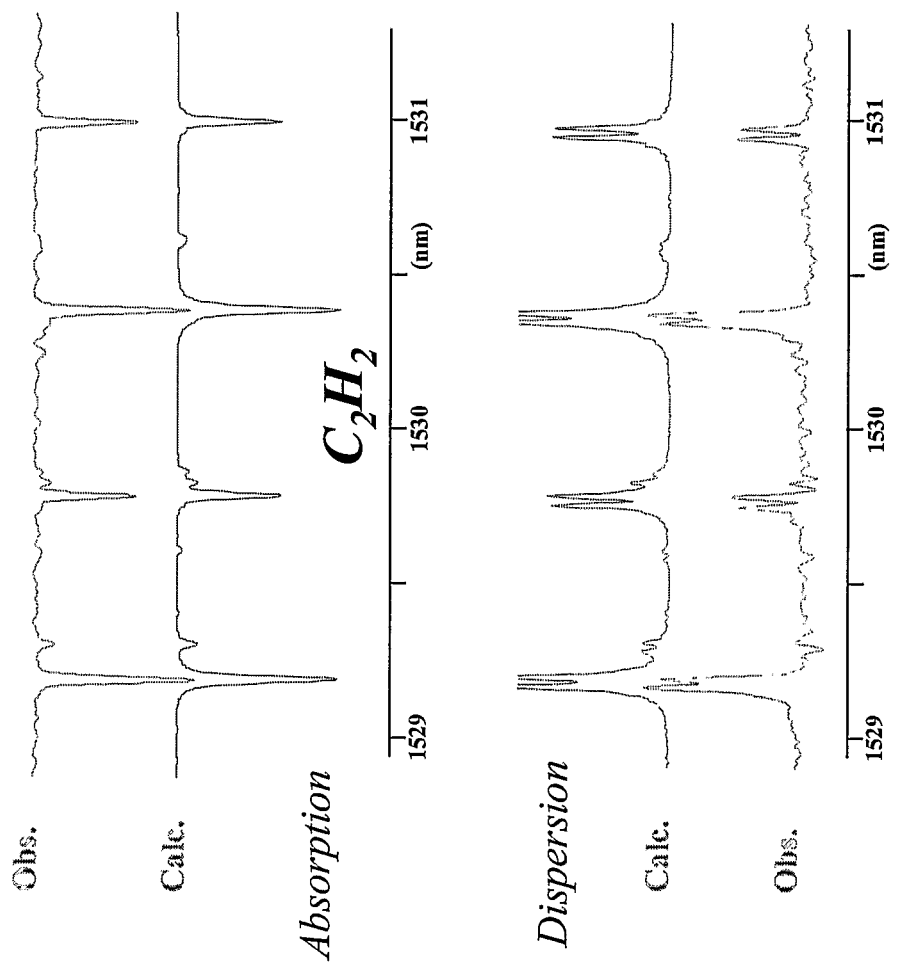
FIG. 7 is a comparison between experimental and calculated absorption and dispersion spectra, according to an embodiment.

According to a specific example of the second embodiment, Proof-of-principle spectra are recorded with a Connes-type two-output stepping-mode interferometer equipped with fast InGaAs detectors. The laser frequency comb source generates pulses of ~40 fs with about 50 mW average output power in the 1.5 μm region. Frep equals 140 MHz. Its cavity includes a Cr4+:YAG crystal pumped by a 1064 nm Nd:YVO4 laser, a semiconductor saturable absorber mirror for mode-locking, and chirped mirrors for dispersion compensation. A commercial lock-in amplifier performs synchronous detection. Data storage and computation are performed on personal computers. Broadband absorption and dispersion spectrum of $C_2H_2$ retrieved from synchronous rf detection at the repetition rate of a $Cr^{4+}$:YAG frequency comb. FIG. 6 displays the absorption spectrum. The good comparison between experimental and calculated absorption and dispersion spectra, according to this specific embodiment, is given on FIG. 7. SNR is unsurprisingly several orders of magnitude less than expected due to several well understood limiting factors among which the inadequate electronic detection chain of the interferometric signal and the noisy behavior of the homemade femtosecond oscillator. The present limitation comes only from the restricted dynamic range of the commercial lock-in amplifier. It presently hampers SNR and resolution of the recorded spectra. Development of a dedicated electronics, based on well-tested methodological solutions may easily overcome this limitation. This demonstration clearly indicates the feasibility of a method according to an embodiment dedicated to the high resolution rapid and sensitive measurement of accurate absorption and dispersion profiles.

Supercontinua produced highly nonlinear fibers seeded by pico- or nanosecond mode-locked may be used for the practice of an embodiment. Depending on the noise on the pulse-to-pulse phase slip, a frequency comb may or may not be achieved from such sources. According to a specific embodiment, this is however enough to make real-time detection of the source repetition rate or to simply lock the pulse repetition rate. The radio-frequency detection of the interferogram may be then performed with or without the aid of an external modulator. According to the second embodiment described above, the comb structure of the source enables to directly perform phase-sensitive radio-frequency detection at a multiple of the comb rate.

Expected sensitivity brought by FTS with a frequency comb light source is due to the combined advantages of laser brightness, Doppler limited resolution, cavity enhancement and high frequency modulation detection. Additionally, operating in the infrared domain where the spectral signatures are strong will contribute to enhance the sensitivity level. As the effects of laser brightness, resolution and infrared operation are embedded in a method, we discuss here the ways to increase absorption path length and to practice high frequency modulation Long equivalent absorption path is obtained with a multi-pass cell or a high finesse cavity in which the sample to be analyzed has been inserted as shown is FIG. 5.

In tunable laser spectroscopy, high finesse cavities have been one of the most efficient ways to reach high sensitivity by cavity enhanced or cavity ring-down spectroscopies. Several attempts to couple a mode-locked laser to a high finesse cavity have been reported, for example in Gohle et al. "Frequency comb Vernier spectroscopy for broadband, high resolution, high-sensitivity absorption and dispersion spectra", Physical Review Letters vol. 99, nb. 263902 (2007), which is incorporated by reference. To ensure efficient coupling into the cavity, all frequency components that make up the pulse train are tuned to resonance with the corresponding cavity modes. A major difficulty is to combine mirror characteristics of low-loss and dispersion-managed broad bandwidth. Though a broadband Ti:Sa frequency comb has been recently coherently coupled to a high finesse cavity (F=~5000) across 100 nm, such experiments are complex as they may require special mirror designs. They may be spectral bandwidth limited. Matching an octave-spanning comb to a cavity with a finesse of several thousands is at the moment a delicate task, but only for technical reasons. The resulting severe restriction of the spectral bandwidth may represent a drastic limitation for Fourier spectrometers, if not for dispersive spectrometers.

An alternative approach may be implemented. It has an advantage that dispersion does not act as a filtering of the spectral bandwidth. The broadband laser is coupled to multipass cells equipped with mirrors made of broadband dielectric coatings for ultra short pulses. White-, Herriott- or Robert-type designs are appropriate amongst others. With a pessimistic value of 99% for the reflection coefficients, 500 m-1 km path lengths are feasible from a 2 m-base cell, thanks to the high output power (>10 mW) and small étendue of the laser beam. This brings sensitivity improvement of about $10^3$. Compensation of the dispersion will be performed, if necessary, at the output of the cell.

The low noise level is due to the original detection technique according to an embodiment taking advantage of the structure of the frequency comb.

To extract weak signals from a noisy background, modulation techniques are indeed recognized as one of the ideal tools. Small resonance information is encoded into a frequency region where the technical noise is relatively weak. Various schemes enable to compare on-resonant and off-resonant cases in a rapid succession. Subsequent demodulations generate a signal channel with no output unless there is a resonance. One of the most successful modulation techniques is called Frequency Modulation (FM) spectroscopy as disclosed in "Frequency-modulation spectroscopy: a technique for measuring weak absorptions and dispersions", Bjorklund, Optics Letters vol. 5 p. 15-17 (1980), which is incorporated by reference. Its capabilities of rapid and sensitive detection have rendered it very popular in non-linear laser spectroscopy. Its high sensitivity is mainly due to its high modulation frequency in the MHz or GHz frequency region, where usually the amplitude noise level of the laser source approaches the shot-noise limit. Such high frequency modulations may be achieved by modulating the injection current into a diode laser or using an external phase modulators. Up to now, FM spectroscopy has only been a tunable spectroscopy method. In most schemes, the laser wavelength is scanned across the atomic/molecular resonance to retrieve the line shape.

As explained above, an embodiment provides a new spectrometry offering sensitivity, resolution, and broad spectral bandwidth based on high frequency modulation. One of the main advantages of FTS is its experimental ability to record at once extended spectral ranges and to give easy access to the infrared domain. To achieve high sensitivity, a new way of modulating the interferogram has been demonstrated on a classical stepping-mode interferometer, for example in Mandon et al "Frequency Modulation Fourier Transform Spectroscopy: a broadband method for measuring weak absorptions and dispersions", Optics Letters vol 32, p. 2206-2208 (2007), which is incorporated by reference. A key concept is that rf modulation is performed. Both the absorption and the dispersion associated with the spectral feature are measured simultaneously.

With FTS with a frequency comb generator light source experiment, the beat signal at the output port of the Fourier transform spectrometer is modulated at a constant radio-frequency, which is about $10^4$ times greater than the audio frequency generated by the interferometer optical conversion. It may be synchronously detected. The sensitivity increases proportionally to the modulation frequency.

The comb structure may be directly available from the source or may be produced by an external modulator. Depending on the noise on the pulse-to-pulse phase slip, a 'real' frequency comb may or may not be achieved from the source. This is however enough to make real-time detection of the source repetition rate that is directly fed to the lock-in or to simply lock the pulse repetition rate for these experiments.

Schemes for an embodiment of the implementation with 1C-FTS of some of the methodologies which are newly reachable thanks to 1C-FTS are now discussed A first aspect of this implementation relates to selective spectroscopy.

Firstly, velocity modulation is intended to selectively detect the transitions of molecular ions. In most tunable-laser or classical FTS, configurations, an ac electric field inside a discharge changes the net drift velocity of the ions at the discharge frequency. This results in a synchronous Doppler shift of the frequency of their transitions, generally very small, whereas neutral species remain unshifted. Synchronous detection at the ac modulation therefore cancels the neutral signatures.

With 1C-FTS, different schemes may be implemented. Only two are discussed here. Any combination of them may be used.

Figure 8:
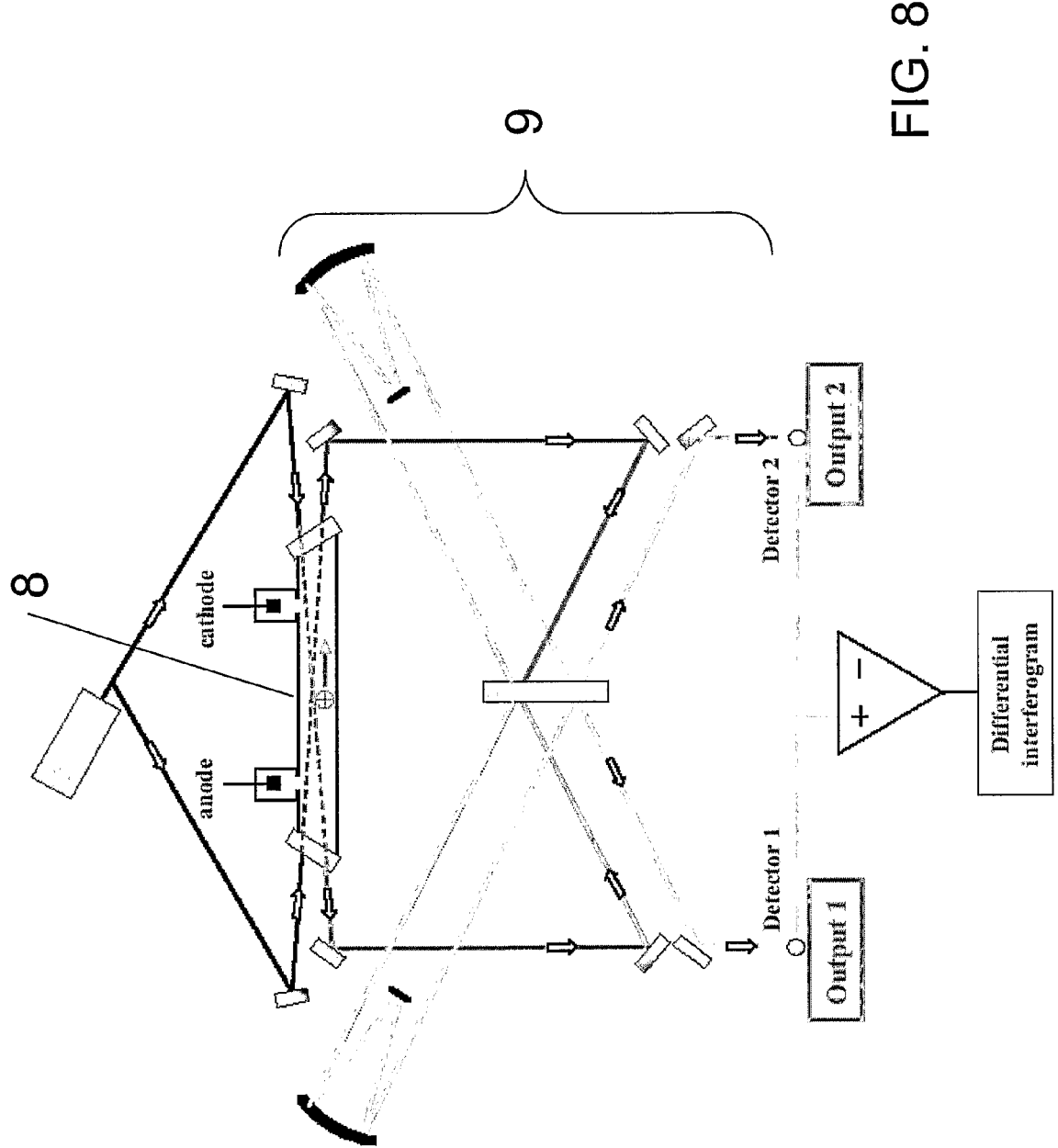
FIGS. 8 and 9 illustrate an embodiment for velocity modulation.

The first one makes use of a dc discharge as shown in FIG. 8. The laser frequency comb generator source can be split into two counter propagating beams, one for the red-shift and one for the blue and analyzed with a two-input two-output interferometer 9. Difference between the two resulting interferograms measured at the output 1 and output 2 of the interferometer which can be made by differential detection as shown in FIG. 8 or a posteriori, brings the selective information. Making the difference of the spectra instead of the interferograms is also appropriate.

Figure 9:
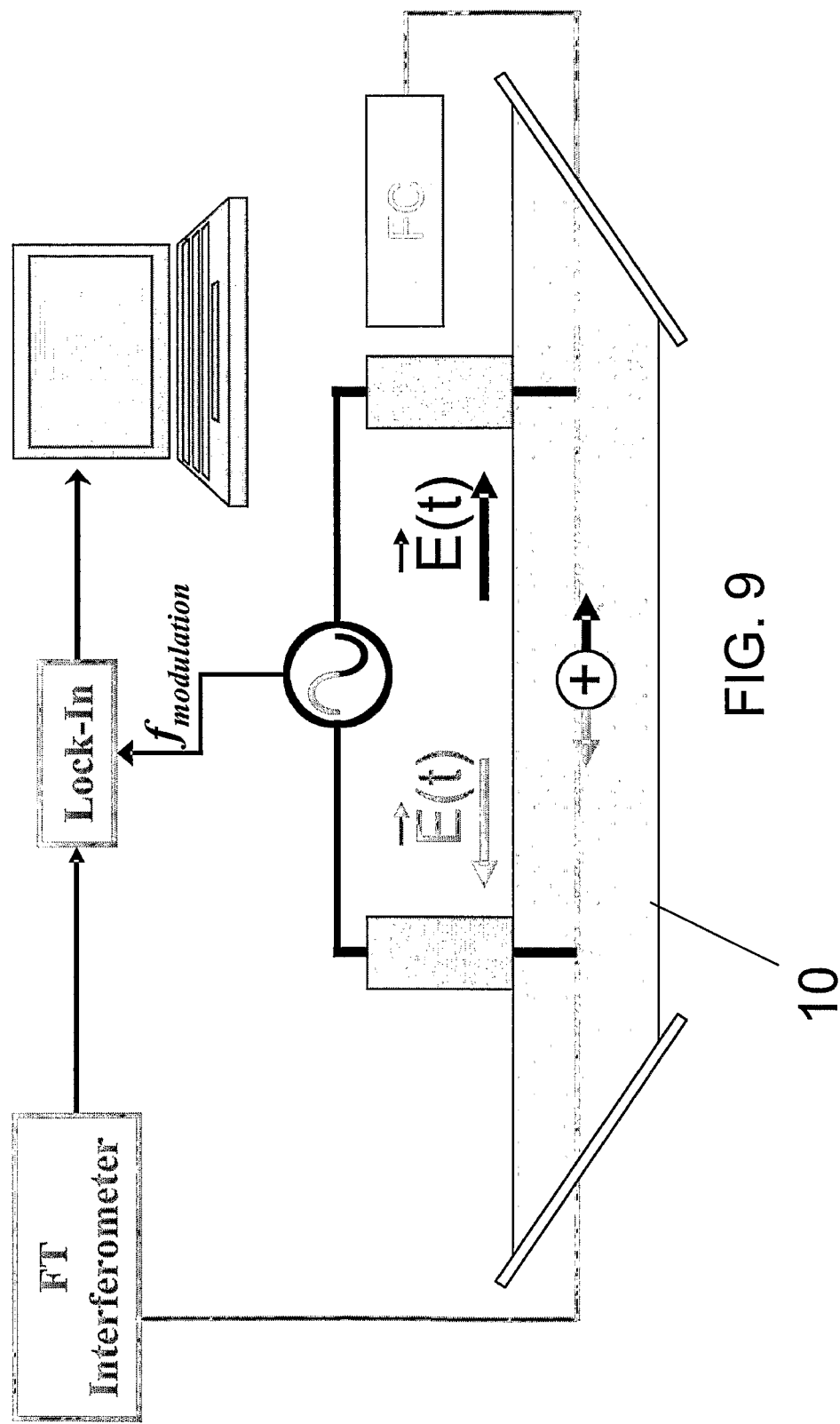

As shown in FIG. 9, the second one exploits an ac modulated discharge 10 to acquire an interferogram recovered by synchronous detection at the frequency rate of the discharge modulation.

Secondly, in Zeeman spectroscopy, one typically periodically varies a magnetic field interacting with the source. After synchronous or differential detection, only the frequency shifted transitions by the magnetic field will then be detected. However, one must consider the symmetry of the Zeeman splitting: one has to modulate the field between $B_c+B_M$ and $B_c-B_M$, where $B_c$ and $B_M$ are two constants values of the magnetic field. $B_c$ can be equal to $B_M$ but cannot be zero, otherwise no signal variation will be detected.

Figure 10:
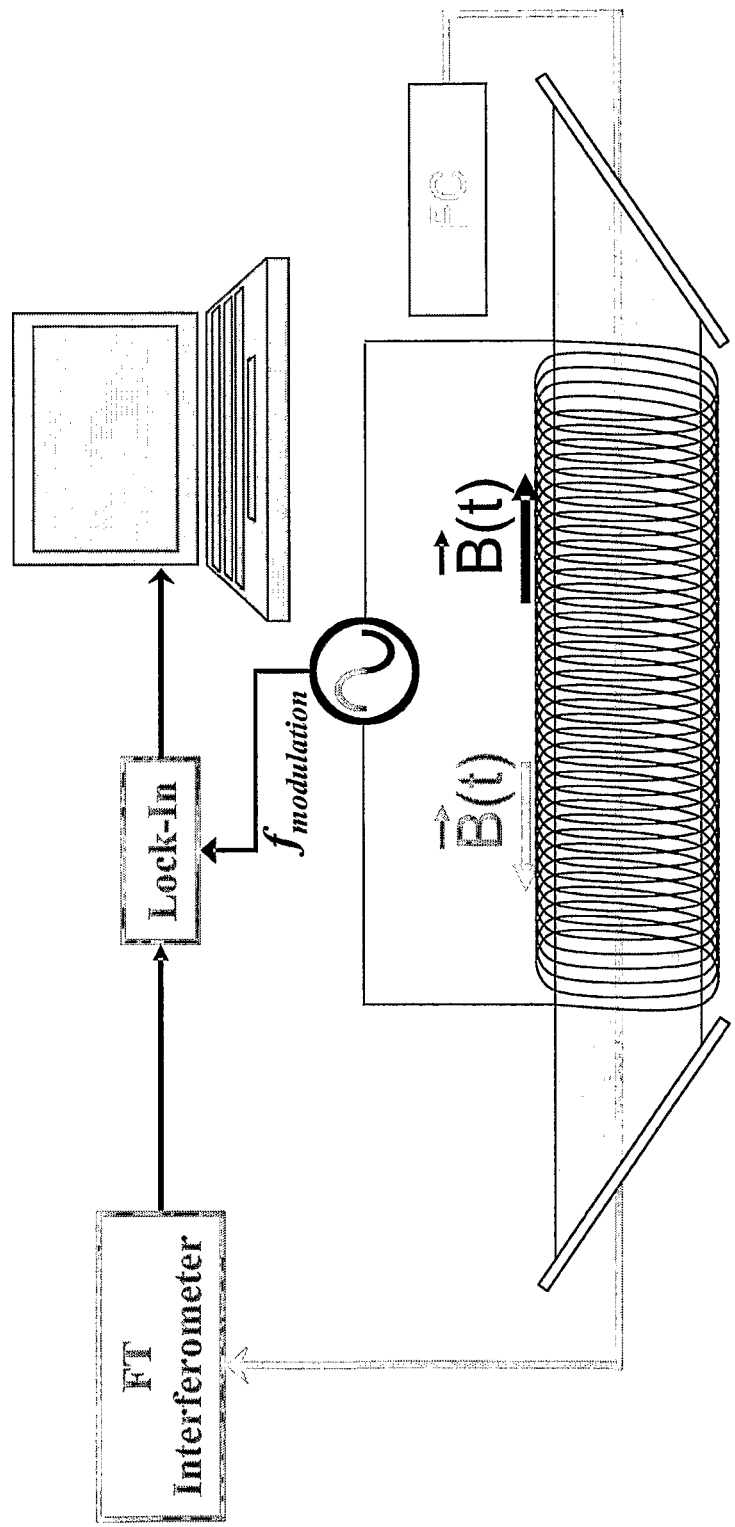
FIGS. 10 and 11 illustrate an embodiment for Zeeman spectroscopy.
Figure 11:
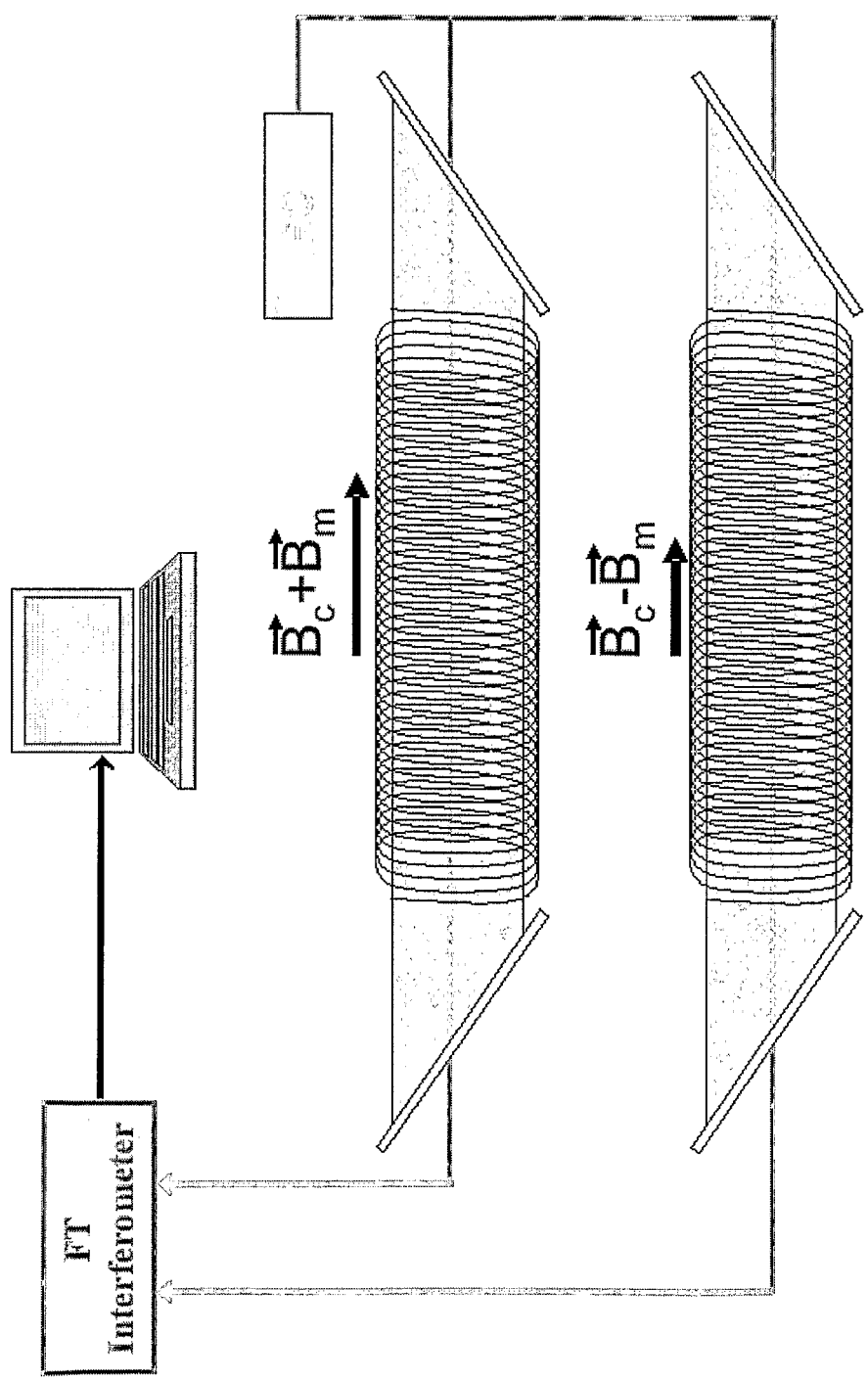

With 1C-FTS, it is possible either to modulate the magnetic field (as shown in FIG. 10) or to split the comb beam into two beams, one probing a cell with a constant magnetic field $B_c+B_M$ while the other probes a cell with a constant magnetic field $B_c-B_M$ for differential detection with a two-input interferometer (as shown in FIG. 11).

Similarly to Zeeman spectroscopy, an electric field may be applied and modulated to selectively detect transitions that are sensitive to the Stark effect.

Thirdly, polarization modulation is useful to selectively detect polarization-sensitive transitions. It is also called linear (comparison between s and p polarization) or vibrational circular dichroism (comparison left and right circularly polarized radiation). Some examples of the subject of studies are chiral molecules or the orientation of molecules in thin solid films, liquid crystals, or Zeeman transitions from paramagnetic species. The difference between the absorption of radiation by two polarization states is often extremely small. The idea is to compare, in a quick succession, spectra resulting from the interaction of the sample with light polarized in two different states.

Figure 12:
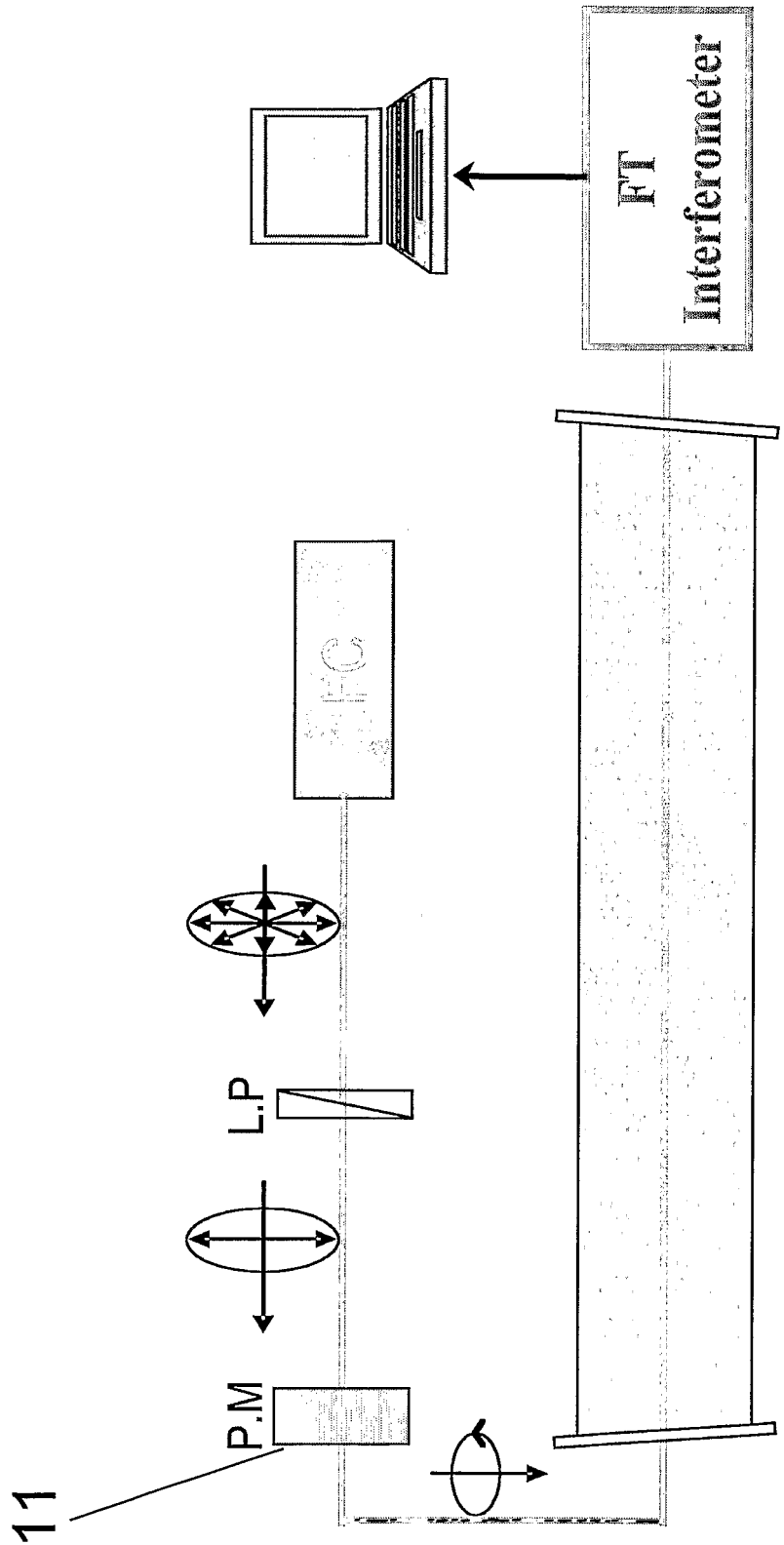
FIGS. 12 and 13 illustrate an embodiment with polarization modulation.
Figure 13:
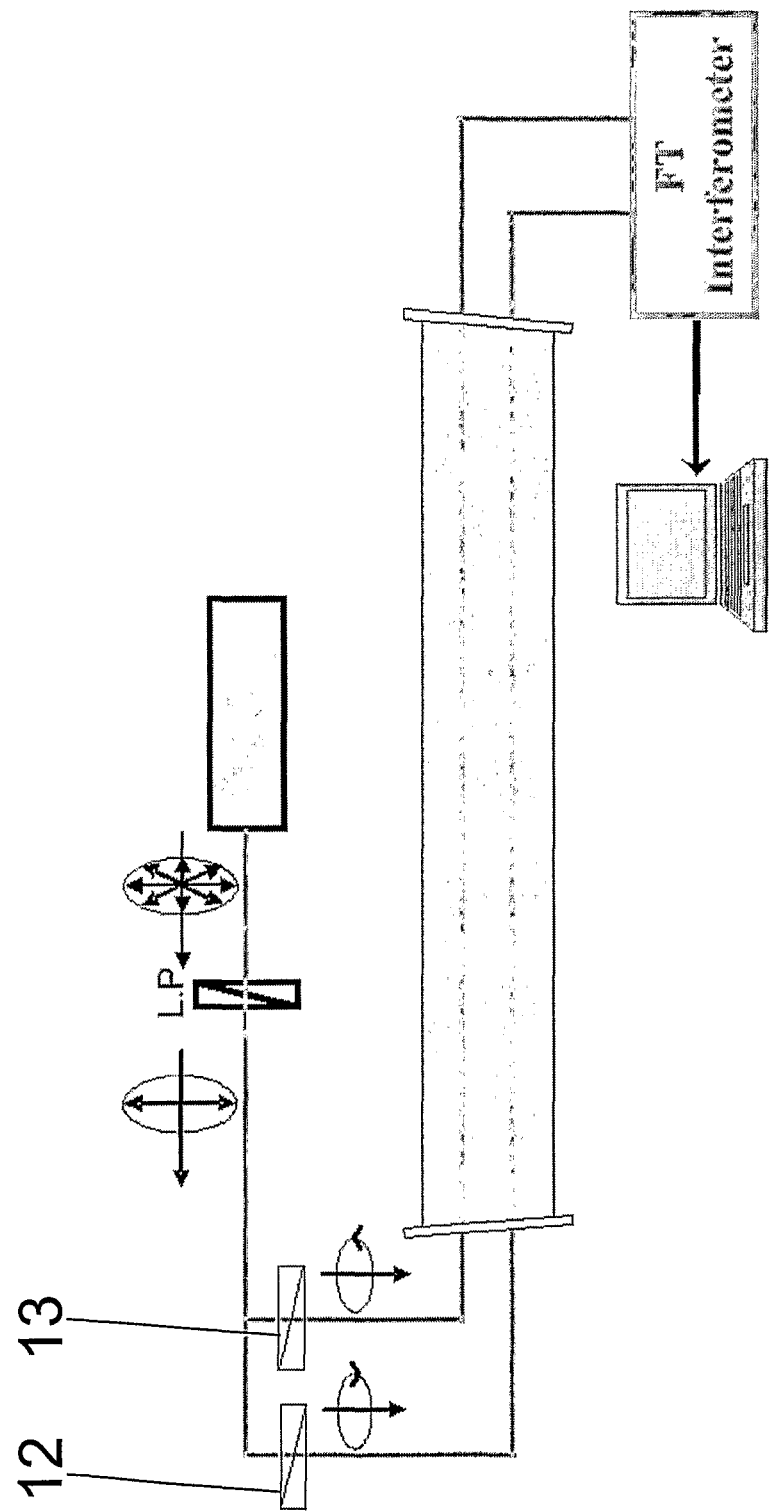

With 1C-FTS, different schemes may be implemented. As shown in FIG. 12, it may be possible to use a polarization modulator 11 on the comb beam and to measure in a quick succession one interferogram with a given polarization and one second with the other polarization and to subtract them by synchronous detection or a posteriori. As shown in FIG. 13, it may also be possible to split the comb beam into two beams, with complementary polarization 12 and 13 and to perform a direct differential detection.

Fourthly, concentration modulation is interesting for the selective detection of short-lived species. With 1C-FTS, the frequency comb generator probes a molecular source (typically a discharge) that is sinusoidally modulated at a given frequency. The beam at the output of the molecular source is analyzed by the interferometer according to an embodiment. The spectrum of the interferogram is detected at twice the frequency so that the transitions of all stable species (which have an intensity that is not modulated by the discharge source) are removed. By adjusting the phase of the detection, it may be additionally possible to get information on the time behavior of the source.

It may be possible to simultaneously benefit in a single experiment from several of the detection schemes evocated above.

A second aspect of this implementation relates to time-resolved applications.

In conventional spectroscopy, time-resolved FTS is a powerful tool to investigate dynamic phenomena, with all the well-known advantages of FTS, especially the wide-spectral range of observation. It consists in performing a time sampling of the evolution of the observed source, at every optical path-difference positions. At the end of the experiment, as many interferograms as time samples of the evolution of the source are obtained and transformed to give spectra, each characterizing the light source at a given time.

Similarly, it may be possible to develop Time-resolved 1C-FTS for improved dynamic studies. Various schemes may be implemented depending of the interferometer type and time-resolution which is looked at.

With a stepping mode interferometer, any kind of time resolution may be obtained. With a rapid-scan interferometer, the synchronization schemes available in the literature that have been successfully implemented may be used. Pump-probe experiments are also feasible when using a pulsed laser source, such as a femtosecond frequency comb, a supercontinuum source or a mode-locked laser.

It is noted that correlation analysis of the time-resolved or modulated spectra may also be performed.

A third aspect of this implementation relates to reflection spectroscopy.

With 1C-FTS, instead of looking at the light which is transmitted by the sample, it is possible to look at the light which is reflected by the sample. The reflection may be diffuse or specular. The sample may be a bulk material, a layer of material (thinner or thicker than the wavelength of the laser radiation) present on a flat reflective surface.

Furthermore, attenuated total reflection enables to probe samples in liquid or solid phase with very easy sample preparation. A probing light beam is passed through a well chosen crystal in such a way that it reflects at least once on the internal surface in direct contact with the sample. This reflection forms an evanescent wave which extends into the sample, typically by a few micrometers. The attenuated energy from each evanescent wave is passed back to the light beam and the beam transmitted by the crystal is then collected by a FT spectrometer as it exits the crystal.

Attenuated total reflection 1C-FTS may be easily implemented with the laser beam probing the crystal/sample assembly.

An embodiment may also be adapted to spatially resolved measurements as described below.

Firstly, as the section of a laser beam may be small, it may be possible to selectively probe tiny spatial regions of a macroscopic sample.

Secondly, an efficient way to map the composition of a sample is to measure all the FT spectra simultaneously with an array detector. Simultaneous measurement of spectra from each point of an image is called hyperspectral imaging, and the array of spectra obtained is a hypercube.

With 1C-FTS, it may be similarly possible to image an object on an array detector at the output of the interferometer.

Thirdly, microscopy with 1C-FTS may bring together the advantages of microscopy with Fourier transform spectroscopy and microscopy with laser sources. Increase of spatial resolution may be expected together with accurate spectral diagnostics.

Fourthly, due to the low divergence and high intensity of laser beams, 1C-FTS may probe long columns of sample. Alternatively, a laser beam may propagate into a long distance before reaching the sample of interest.

LIDAR-type 1C-FTS experiment may also be implemented: the sample-scattered light from an intense broadband laser can be collected and analyzed.

The following aspects of an embodiment may also be considered.

With the aid of non-linear processes (for instance difference and sum frequency generation, parametric interaction, optical rectification, harmonic generation . . . ), it may be possible to develop 1C-FTS in spectral regions which are presently difficult to access: THz or VUV regions for instance. It may also be possible to use the inverse nonlinear process for the detection scheme, i.e., to re-convert the light to a region where sensitive detectors are available.

Furthermore, 1C-FTS is expected to be a tool for diagnosing various media, such as plasmas, ambient air, industrial production chains, leak detection, hazardous gas detection, etc. . . . . All the classical qualities of optical spectroscopy are preserved: in situ, local or remote operation, non intrusive diagnostic, quantitative measurements . . . .

The photon detectors may consist of simple photodetectors (photodiode, bolometer, antenna) or non-linear frequency converters, e.g. frequency doubling devices, coupled to photodetectors. It is noted that the photon detector may be replaced by a microphone or a high Q piezoelectric crystal element such as quartz crystal tuning forks.

Gas chromatography (GC), High Performance Liquid Chromatography (HPLC) or Supercritical fluid chromatography (SFC) may be coupled to 1C-FTS.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A Fourier transform spectrometer for analyzing a sample comprising:
 a coherent light source comprising a frequency comb generator having a defined frequency repetition rate, wherein the frequency comb generator is split into two counter propagating beams, one for red-shift and one for blue;
 a two-input two-output Fourier transform interferometer, based on amplitude or wavefront division, comprises a fixed arm and a moving arm and is adapted to separate the coherent light source into two parts, each part following one arm, in order to generate interferences between the two parts and analyzing said two counter propagating beams;

a differential detection means adapted to obtain the difference between the two resulting interferograms measured at the two outputs of the Fourier transform interferometer; and wherein the sample is positioned on the light path between the coherent light source and the Fourier transform interferometer.

2. A Fourier transform spectrometer according to claim 1 wherein the detection means are adapted to detect the beating of pairs of frequencies of the frequency comb separated by the frequency repetition rate or a multiple of the frequency repetition rate.

3. A Fourier transform spectrometer according to claim 1 wherein the interferometer is a Michelson interferometer.

4. A Fourier transform spectrometer according to claim 1 further comprising at least one multipass cell adapted to receive the sample to be analyzed by the spectrometer.

5. A Fourier transform spectrometer according to claim 1 further comprising at least one high finesse cavity adapted to receive the sample to be analyzed by the spectrometer.

* * * * *